(12) United States Patent
Stewart et al.

(10) Patent No.: US 12,347,229 B2
(45) Date of Patent: Jul. 1, 2025

(54) SYSTEM AND METHOD FOR USING ARTIFICIAL INTELLIGENCE TO ENABLE ELEVATED TEMPERATURE DETECTION OF PERSONS USING COMMODITY-BASED THERMAL CAMERAS

(71) Applicant: Xtract One Technologies Inc., Toronto (CA)

(72) Inventors: James Ashley Stewart, Saint John (CA); Vadym Babiuk, Saint John (CA); James Allan Douglas Cameron, Fredericton (CA); Phil Konrad Munz, Saint John (CA); Ryan Finn, Saint John (CA)

(73) Assignee: XTRACT ONE TECHNOLOGIES INC.

( * ) Notice: Subject to any disclaimer, the term of this patent is extended or adjusted under 35 U.S.C. 154(b) by 1056 days.

(21) Appl. No.: 17/330,332

(22) Filed: May 25, 2021

(65) Prior Publication Data

US 2021/0364356 A1     Nov. 25, 2021

Related U.S. Application Data

(60) Provisional application No. 63/029,609, filed on May 25, 2020.

(51) Int. Cl.
| | | |
|---|---|---|
| *G06V 40/00* | (2022.01) | |
| *G01J 5/00* | (2022.01) | |
| *G06N 3/045* | (2023.01) | |
| *G06N 3/08* | (2023.01) | |
| *G06V 10/75* | (2022.01) | |

(Continued)

(52) U.S. Cl.
CPC .......... *G06V 40/168* (2022.01); *G01J 5/0025* (2013.01); *G06N 3/045* (2023.01); *G06N 3/08* (2013.01); *G06V 10/76* (2022.01); *G06V 40/171* (2022.01); *H04N 5/33* (2013.01); *H04N 23/611* (2023.01); *G01J 2005/0077* (2013.01); *G01J 5/485* (2022.01)

(58) Field of Classification Search
CPC .... G06V 40/168; G06V 40/171; G06V 10/76; G06N 3/045; G06N 3/08; H04N 23/611; H04N 5/33; G01J 5/0025; G01J 5/485; G01J 2005/0077
See application file for complete search history.

(56) References Cited

U.S. PATENT DOCUMENTS

| | | | |
|---|---|---|---|
| 2021/0211590 A1* | 7/2021 | Harrison | G06V 40/166 |
| 2022/0172122 A1* | 6/2022 | Shen | G06F 18/251 |

FOREIGN PATENT DOCUMENTS

| | | | |
|---|---|---|---|
| JP | 2009290542 A | * | 12/2009 |
| TW | M605852 U | * | 12/2020 |

* cited by examiner

*Primary Examiner* — Khai M Nguyen

(57) ABSTRACT

A multi-sensor threat detection system and method for elevated temperature detection using commodity-based thermal cameras and mask wearing compliance using optical cameras. The proposed method does not rely on the accuracy of thermal cameras, but the combination of mathematics, statistics, machine learning, artificial intelligence, computer vision and Manifold learning to construct a classifier, or set of classifiers, that are able to, either alone or working as an ensemble, evaluate a person as being 'normal temperature' or 'elevated temperature' by virtue of 'how they present to the camera' vs. any absolute temperature measurements from the camera itself.

11 Claims, 20 Drawing Sheets

(51) Int. Cl.
*G06V 40/16* (2022.01)
*H04N 5/33* (2023.01)
*H04N 23/611* (2023.01)
*G01J 5/48* (2022.01)

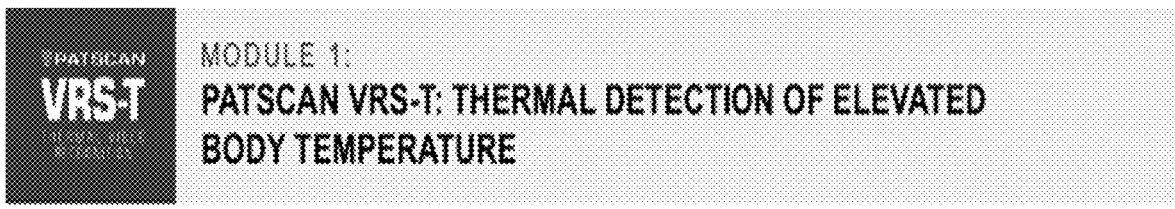
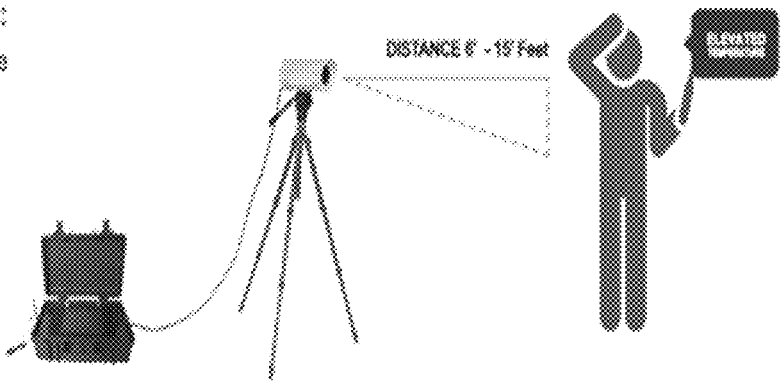
FIG. 3

MODULE 2: PATSCAN VRS-HS FACIAL MASK DETECTION FOR HEALTH & SAFETY

MODULE OVERVIEW

PATSCAN VRS-HS Facial Mask Detection Module is a new enhancement to Patriot One's comprehensive PATSCAN Platform for public safety. The company has advanced its non-intrusive computer vision/video analytics module to leverage common off-the-shelf digital video cameras.

DETECTION

This all-new module is designed for deployment across multiple digital video cameras on a networked VMS system. Cameras situated at key entryways enable the detection of facial mask compliance to assist in preventing the spread of viruses or contagions.

LOCATIONS

Perfect for hospitals, business offices, event/sports venues, government buildings, retail, schools and universities and other locations where the public gathers and hygiene concerns are critical.

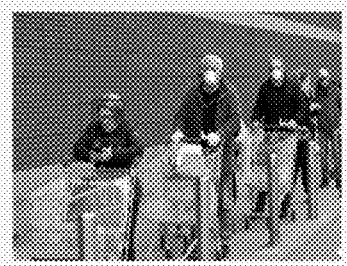

FIG. 4

EQUIPMENT & SPECS REQUIRED

PATSCAN APPROVED THERMAL CAMERA

Operational Distance
0-15 feet

Operational Requirements
Subject stopped facing camera with no obstructions (mask, glasses or hats)

Camera Requirements
Resolution: 640 x 480
Protocols: RTSP with H264/H265
Colour Space: RGB with Rainbow palette
Framerate: 4-8 fps
Sensor spectral range: 8-13μm
Sensor Sensitivity: ≤50°C

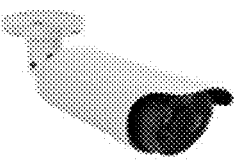

PATSCAN APPROVED DIGITAL VIDEO CAMERA

Requirements
Resolution: 720p-4K (See adjacent chart)
Colour Space: RGB
Protocols: RTSP with H264/H265
Framerate: Minimum 8 fps for accurate detection

PATSCAN "Edge"
Approved Laptop Computer

♥ PATSCAN VRS-T
THERMAL VIDEO RECOGNITION

PATSCAN VRS-T
Thermal Elevated Body
Temperature Module

♥ PATSCAN VRS-HS
HEALTH + SAFETY

PATSCAN VRS-HS
Health & Safety Face Mask
Detection Module

Not all cameras are equal...
It is crucial to match camera capabilities with the appropriate location in order to achieve optimal detection.

| Range Factors | Short Range | Medium Range | Long Range |
|---|---|---|---|
| Large Object (+24") | 0-15 ft | 0-45 ft | 0-75 ft |
| Small Object (5"+) | 0-7 ft | 0-22 ft | 0-45 ft |
| Resolution | 720p | 1080p | 4K |
| Use Case Examples | Hallways, Stairwells, Entryways | Hallways, Vestibules, Lobbies, Food courts/Cafeterias | Courtyards, Parking Lots, Gymnasiums, Theater |

FIG. 6

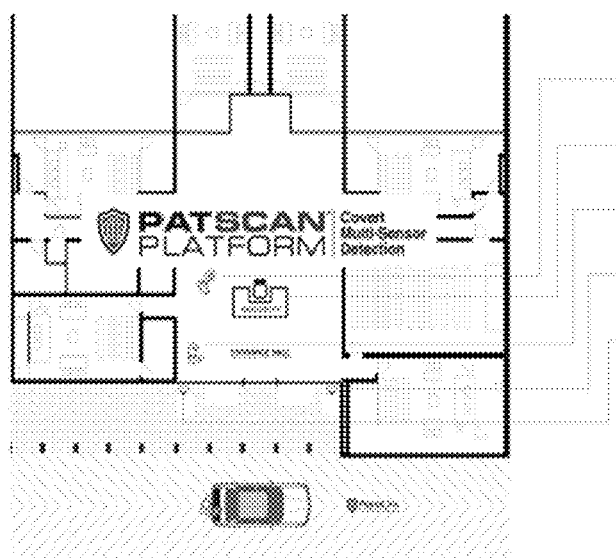
FIG. 9

SYSTEM AND METHOD FOR USING ARTIFICIAL INTELLIGENCE TO ENABLE ELEVATED TEMPERATURE DETECTION OF PERSONS USING COMMODITY-BASED THERMAL CAMERAS

CROSS REFERENCE TO RELATED APPLICATIONS

The application claims priority to and the benefit of U.S. Provisional Patent Application Ser. No. 63/029,609, entitled "SYSTEM AND METHOD FOR USING ARTIFICIAL INTELLIGENCE TO ENABLE ELEVATED TEMPERATURE DETECTION OF PERSONS USING COMMODITY-BASED THERMAL CAMERAS", filed on May 25, 2020, the disclosure of which is incorporated herein by reference in its entirety.

BACKGROUND

The embodiments described herein relate to security and surveillance, in particular, technologies related to video recognition threat detection.

Existing elevated temperature systems simply utilize the temperature measurements as provided by the thermal camera itself. Some systems use artificial intelligence (AI) to detect the face or other regions of interest (e.g., arms and legs) to enable capturing the temperature measurements for specific regions while ignoring other benign objects like, for example, a hot beverage. Some systems even focus in on specific areas of the facial region like the inner canthus or tear ducts, which have been shown to most accurately reflect core-body temperature. While novel, all such strategies fail when using a commodity-based camera that does not have a tight enough temperature variance to be suitable for evaluating persons for elevated temperatures. For example, the popular Axis Q2901-E Temperature Alarm Camera has a temperature variance of +/−5° C. (+/−9° F.) accuracy rendering it inappropriate for such use cases.

Academic research has shown that early detection of contagious pathogens such as H1N1, Seasonal Influenza (Flu), or Coronavirus outbreaks such as SARS-CoV, MERS-CoV or SARS-CoV-2 (CoVID-19) could help slow rates of infection, limit the impact on regional community healthcare services and increase the probability for timely treatment.

A platform for threat detection solutions is envisioned. This software platform may use thermal cameras and other sensor technologies for temperature measurements for threat detection, including such dangers as weapons and physical threats, as well as early detection of viral pathogens such as COVID-19, H1N1 Influenza and other microbiological threats to prevent spread of these pathogens.

SUMMARY

A multi-sensor threat detection system and method for elevated temperature detection using commodity-based thermal cameras and mask wearing compliance using optical cameras. The proposed method does not rely on the accuracy of thermal cameras, but the combination of mathematics, statistics, machine learning and computer vision to construct a classifier or set of classifiers that are able to, either alone or working as an ensemble, evaluate a person as being 'normal temperature' or 'elevated temperature' by virtue of 'how they present to the camera' vs. any absolute temperature measurements from the camera itself.

BRIEF DESCRIPTION OF THE DRAWINGS

FIG. 3 is a diagram illustrating thermal detection of elevated body temperature.

FIG. 4 is a diagram illustrating a facial mask compliance detection module.

FIG. 6 is a diagram illustrating equipment & specs required for Module 1 and 2 including both thermal and mask components.

FIG. 9 is a diagram illustrating a deployment for a building exterior scenario including both thermal and mask components.

DETAILED DESCRIPTION

In a preferred embodiment, a multi-sensor covert threat detection system is disclosed. This covert threat detection system utilizes software, artificial intelligence and integrated layers of diverse sensor technologies (i.e., cameras, etc.) to deter, detect and defend against active threats (i.e., detection of guns, knives or fights) or health related risks (i.e., presence of a fever or noncompliance of recommended mask wearing or social distancing) before these threat events occur.

The threat detection system enables the system operator to easily determine if the system is operational without requiring testing with actual triggering events. This system also provides more situational information to the operator in real time as the incident is developing, and showing them what they need to know, when they need to know it.

Figure 19:
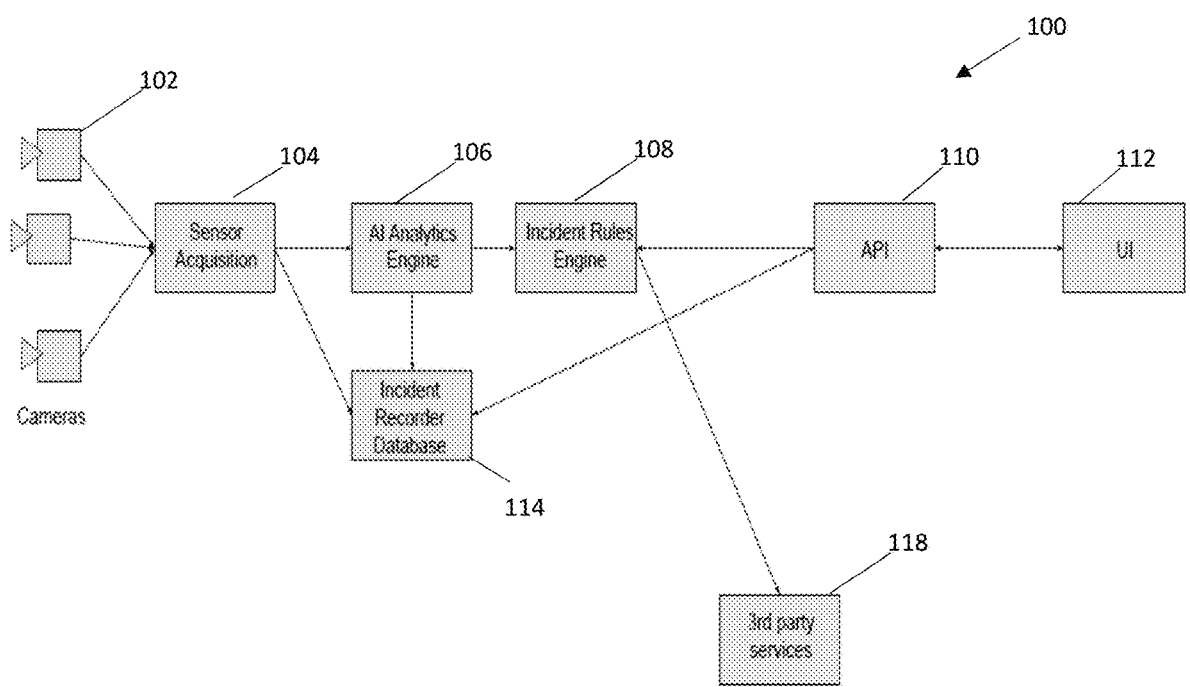
FIG. 19 is a system diagram of an exemplary threat detection system.

FIG. 19 is a system diagram of an exemplary threat detection system. As seen in FIG. 19, threat detection system 100 consist of one or more cameras 102 configured to record video data (images and audio). Cameras 102 is connected to sensor or sensor acquisition module 104. Once the data is acquired, the data is sent simultaneously to an AI Analytics Engine 106 and Incident Recorder Database 114. AI Analytics Engine 106 analyzes the data with input from an Incident Rules Engine 108. Thereafter, the data is sent to an application program interface (API) 110 or sent to $3^{rd}$ party services 118. The output form the API 110 will be sent to a user interface (UI) 112 or graphical user interface (GUI). Furthermore, the output from the API 110 and AI Analytics Engine 106 will be further recorded at the Incident Recorder Database 114.

While there do exist high-end thermal cameras that are suitable for evaluating elevated temperatures in people, most commodity-based cameras have too wide a temperature variance to be used for this purpose. Having an analysis technique capable of accurately classifying persons as 'normal temperature' or 'elevated temperature' using any combination of thermal video, or thermal video frames, from commodity-based cameras without regard to what the actual absolute temperature measurement is, would be a significant step towards making such capabilities accessible to a wider consumer base and thus increasing our ability to protect against contagions by highlighting the subset of people that present with a higher than normal temperature. This is not meant as a silver bullet but would allow locations to highlight those symptomatic people that should be sent for secondary screening. It should also be noted that skin temperature may not always reflect core-body temperature.

The approaches used in this disclosure do not rely on the accuracy of thermal cameras. Instead, we use any combination of mathematics, statistics, machine learning, computer vision to construct a classifier or set of classifiers, that are able to, either alone or working as an ensemble, evaluate a person as being 'normal temperature' or 'elevated temperature' by virtue of 'how they present to the camera' vs. any absolute temperature measurements from the camera itself. Such learning approaches, as Manifold Learning, take the less obvious 'higher-level' features and map them to a lower dimensional representation where these new 'lower-level' features may be analyzed to get that classification of 'normal' or 'elevated body temperature.

With an intuition of what these lower-level features are due to the reduced mapping of the Manifold Learning routine, one embodiment incorporates a sufficiently trained Manifold Learning backbone that identifies relative geometric and intensity features that normalize across the thermal video data down to the single video-frame level, without regard to absolute temperature measurements from the camera, which may not be accurate enough on its own. Identifying such features removes the problem where the temperature spectrum of a thermal camera is not consistent across time because it is based on the measured range of absolute temperatures present within the video frame in any single instance. Relative features like this could be used to evaluate for elevated temperatures regardless of the absolute temperature measurements present within a frame, which can vary by camera, by environment and even by time of day.

Figure 11:
FIG. 11 is a diagram illustrating thermal camera color intensity.

Artificial Intelligence (AI) has been shown to be influenced by tiny details that are imperceptible to humans. Ilyas et al. provide evidence that AI can pick up on characteristics that are invisible to humans but are present in the real world. The approach described here utilizes this phenomenon along with the geometric information, among other mathematical, statistical, machine learning, and computer vision techniques to classify persons as being 'normal temperature' or 'elevated temperature' without regard to the actual absolute temperature measurements of the thermal camera. FIG. 11 is an example of an AI face-detection system to be used.

Health & Safety Products:

A multi-sensor threat detection system such as the Patriot One Technologies PATSCAN Video Recognition System (VRS) may include products and modules for different verticals and markets. As an example, the PATSCAN VRS platform has a Health & Safety Product offering including an Elevated Body Temperature & Identification module and a Health & Safety Compliance Detection module. Furthermore, in other embodiments, the Health and Safety module includes mask detection/compliance.

Module 1: VRT-T Elevated Body Temperature Screening & Identification

Figure 1:
FIG. 1 is a diagram illustrating an exemplary thermal module.

FIG. 1 is a diagram illustrating an exemplary thermal module. This module may utilize artificial intelligence (AI) in further versions of the software module to identify and analyze instances of elevated body temperature. Anomalous detection outside a nominal temperature range results in an alert transmitted to onsite security for further action employing standard operating procedures as defined by the facility management or organization. Providing early indications of disease transmissibility of individuals within populous or crowded locations can provide significant improvements in overall safety.

Figure 2:
FIG. 2 is a diagram illustrating checkpoint screening.

The thermal module of FIG. 1 is suitable for use in offices, care facilities and other locations where organizations wish to screen incoming employees and visitors for possible elevated body temperatures indicative of fever from flu-like symptoms. The solution can be used to quickly screen individuals or a queue of people entering a facility in a controlled checkpoint environment. FIG. 2 is a diagram illustrating checkpoint screening leveraging these advanced AI techniques.

FIG. 3 is a diagram illustrating thermal detection of elevated body temperature. This module is designed for deployment on a single thermal camera at entrances for the detection of elevated body temperatures, which may indicate a fever related to a virus or contagion. It is suitable for an operator stationed inside or outdoors, or as a temporary station for a dedicated screening room.

As seen in FIG. 3, this module can detect elevated temperature from a range of 6 feet to 15 feet. This module can be collapsible for easy transport, is study and provides for ergonomic setup for laptop, cameras and power supply.

Module 2: VRS-HS Health & Safety Face Mask Compliance Detection

FIG. 4 is a diagram illustrating a facial mask compliance detection module. According to FIG. 4, the face mask compliance detection module uses computer vision analytics that leverages common off-the-shelf digital video camera technology. The module is designed for deployment on single or multiple digital video camera networks for the detection of face mask compliance to assist in preventing the spread of viral pathogens. This module is ideal for deployments for hospitals, business offices, event/sports venues, government buildings, retail, schools and universities and other locations where public gathers, and health concerns are critical.

An alert/no-alert notification can be programmed to the user or system:

No Alert Notification: MASK IN-PLACE/COMPLIANT

Alert Notification: NO MASK/NON-COMPLIANT

Figure 5:
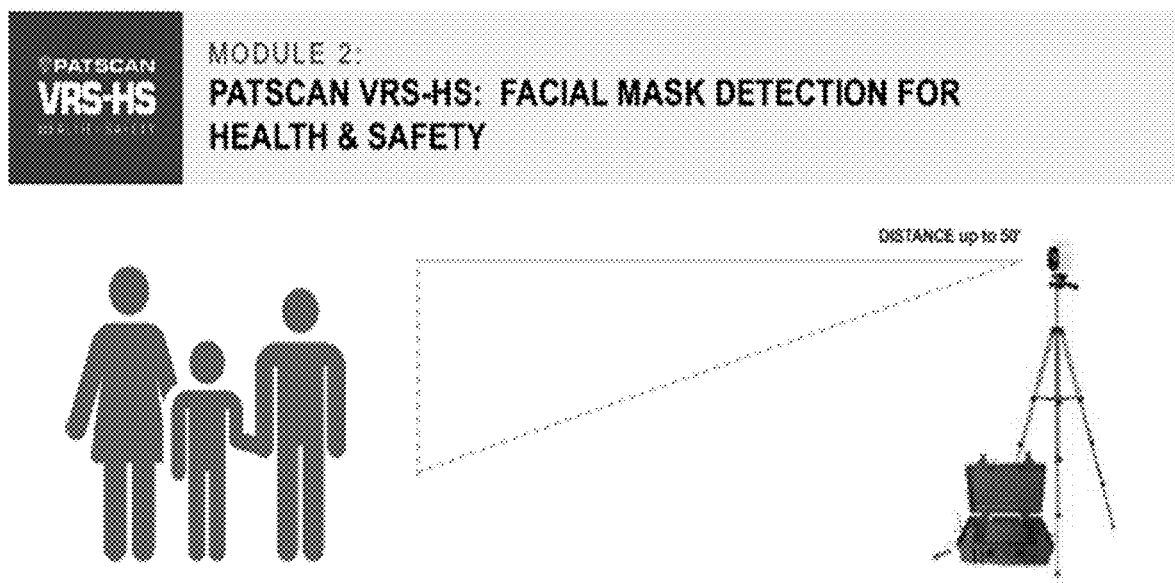
FIG. 5 is a diagram illustrating effective distance for facial mask detection for health & safety.

FIG. 5 is a diagram effective distance for facial mask detection for health & safety. As seen in FIG. 5, this module can be effective for up to 50 feet.

Equipment & Specs:

FIG. 6 is a diagram illustrating equipment & specs required for Module 1 and 2 including both thermal and mask components. According to FIG. 6, equipment and specs include an approved thermal camera, an approved digital video camera, an approved laptop computer and threat detection system software modules for thermal video recognition (i.e., thermal elevated body temperature module) and health and safety (i.e., health & safety face mask detection module).

Figure 7:
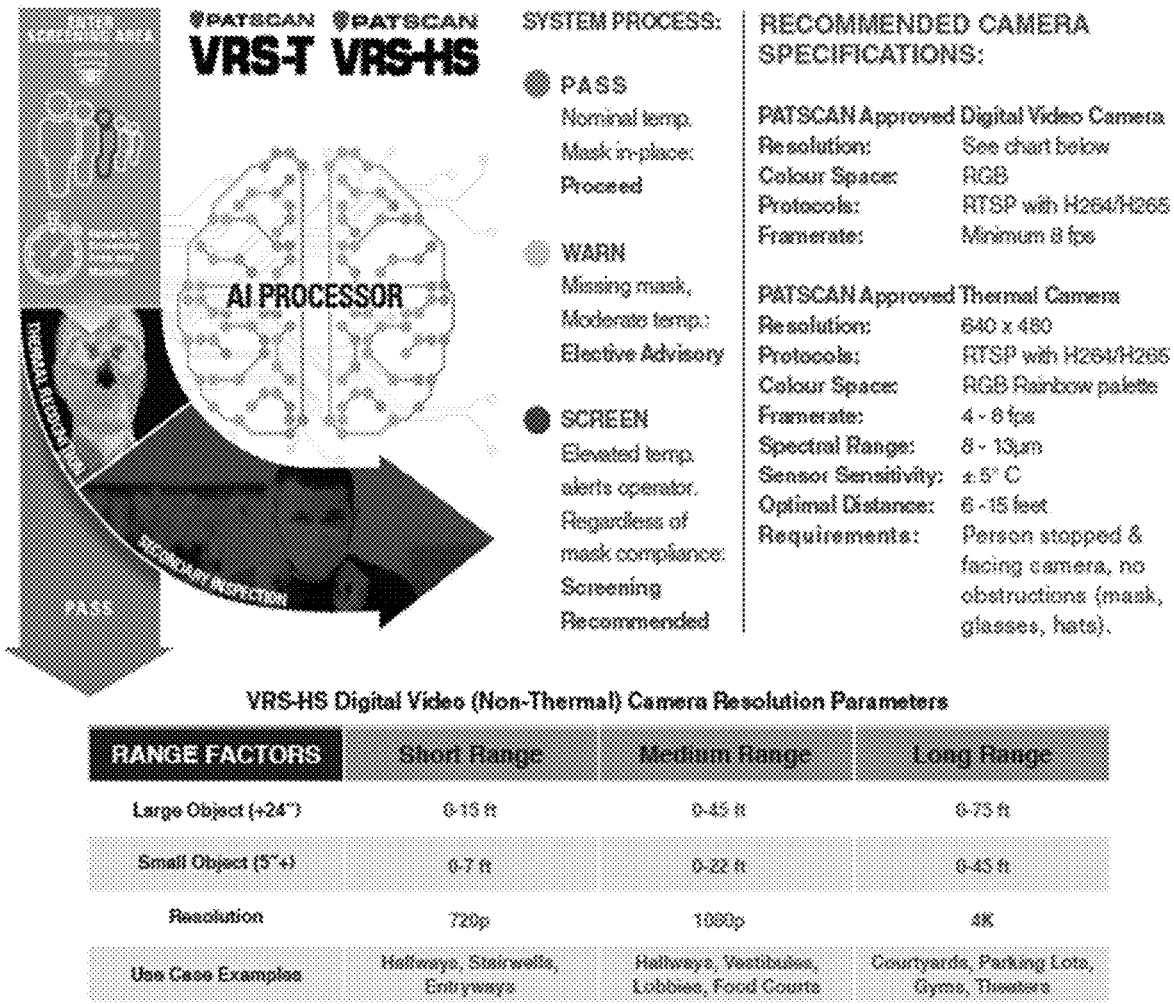
FIG. 7 is a diagram illustrating installation considerations for Module 1 and 2 including both thermal and mask components.

Installation Considerations:

FIG. 7 is a diagram illustrating installation consideration for Module 1 and 2 including both thermal and mask components. According to FIG. 7, locations are reviewed for effectiveness based on environmental variables. These variables include distance from a camera to detection zone, number of persona present, screen area height, width and length, camera angle, fluctuating skin temperatures and weather conditions. The variables are all factored into the artificial intelligence (AI) software for each unique deployment.

Figure 8:
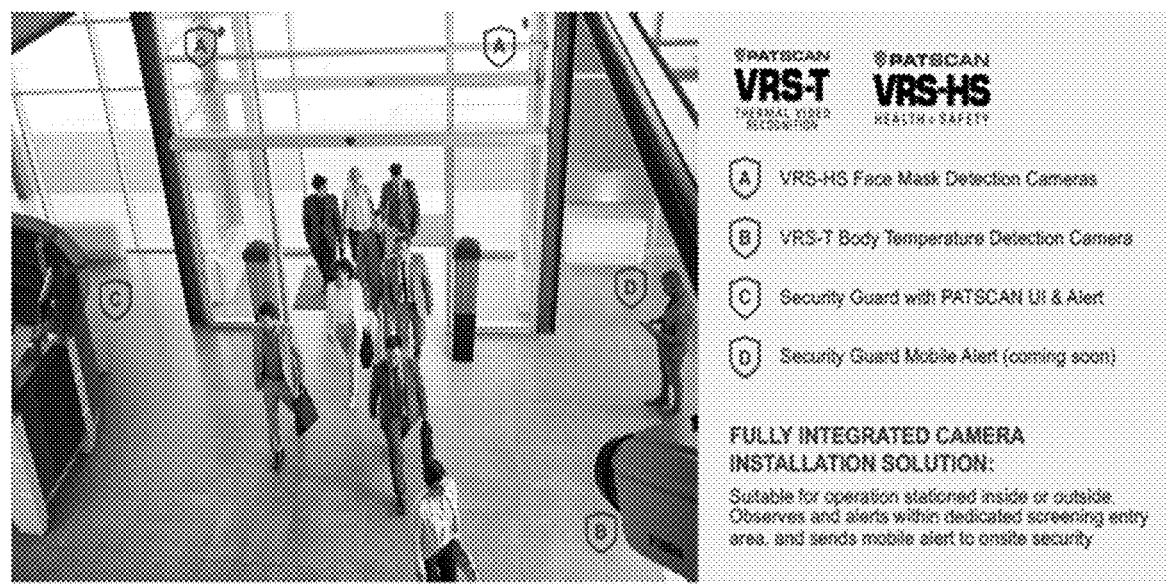
FIG. 8 is a diagram illustrating a deployment for a building interior scenario.

Health & Safety Threat Installed Deployment Scenario:

FIG. 8 is a diagram illustrating a deployment for a building interior scenario. As seen in FIG. 8, a building entry scenario is envisioned. According to FIG. 8, one or more face mask detection cameras (A) can be deployed at the entrance. A body temperature camera (B) is placed opposite the entrance. Security guards (C) with mobile application may be situated nearby. Further, once an event is observed, an alert is sent to an onsite security guard (D).

FIG. 9 is a diagram illustrating a deployment for a building exterior scenario including both thermal and mask components. A fully, integrated camera installation is envisioned. This is suitable for operation stationed inside or outside. The system Observes and alerts within dedicated screening entry area, and sends mobile alert to onsite security.

Figure 10:
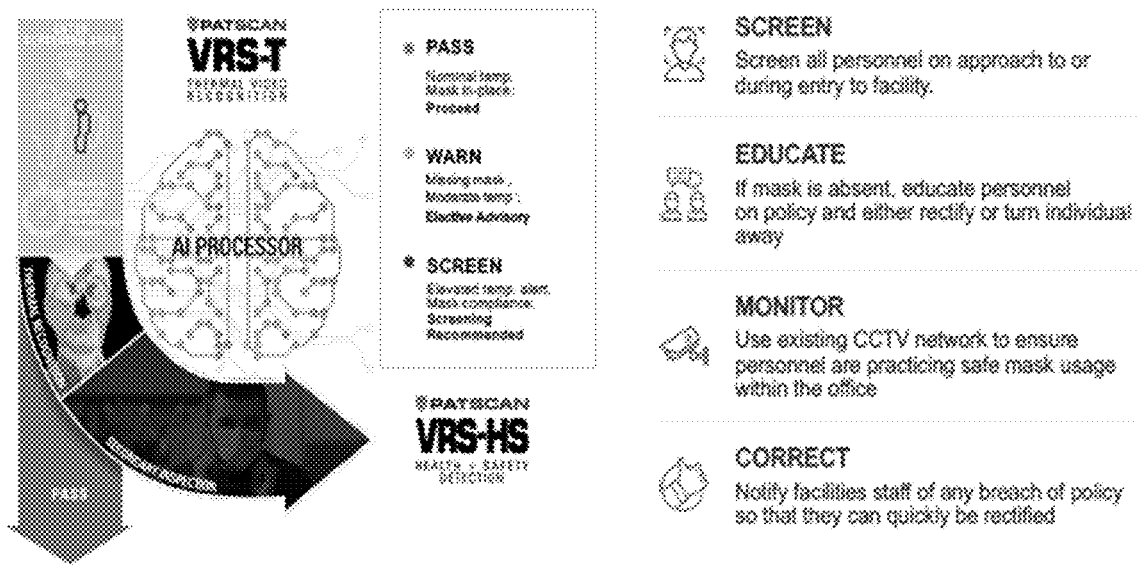
FIG. 10 is a diagram illustrating a process for secondary screening including both thermal and mask components.

FIG. 10 is a diagram illustrating a process for secondary screening including both thermal and mask components. A workflow for secondary screen is as follows:
Person enters screening area
Person remains in screening area and monitor for following triggers:
Pass: Nominal temperature, mask in place, proceed
Warn: Missing mask, moderate temperature, elective advisory
Screen: Elevated temperature, alert, mask compliance, screening recommended
Thermal Recognition
Secondary Inspection
Pass FIG. 11 is a diagram illustrating thermal camera color intensity. This example of lower-level features is just for illustration purposes but, in fact, artificial intelligence (AI) has been shown to be influenced by tiny details that are imperceptible to humans. A recent paper by "Ilyas et al." provides evidence that AI can pick up on characteristics that are invisible to humans but are present in the real world. The approach described here utilizes this phenomenon, along with the geometric information among other mathematical, statistical, machine learning, computer vision and learning techniques to classify persons as being 'normal temperature' or 'elevated temperature' without regard to the actual absolute temperature measurements of the thermal camera.

Referring to FIG. 11, one objective is to protect any analysis of thermal video or thermal video frames that can be used to classify a person as being 'normal temperature' or 'elevated temperature' without regard to the absolute temperature measurements of the thermal camera.

As described above, the analysis used to distinguish between 'normal' and 'elevated' temperature can range from mathematical models to the more modern deep learning models, or any combination thereof. An example of each follows.

Mathematical Model:

This capability can be incorporated into organizational workflows in support of emerging pandemic management procedures. Available as either single or multi-person screening, this approach can be deployed anywhere within an organization including but not limited to entryways, lobbies, or other vulnerable areas where it would be valuable to screen for persons with elevated temperatures.

Figure 12:
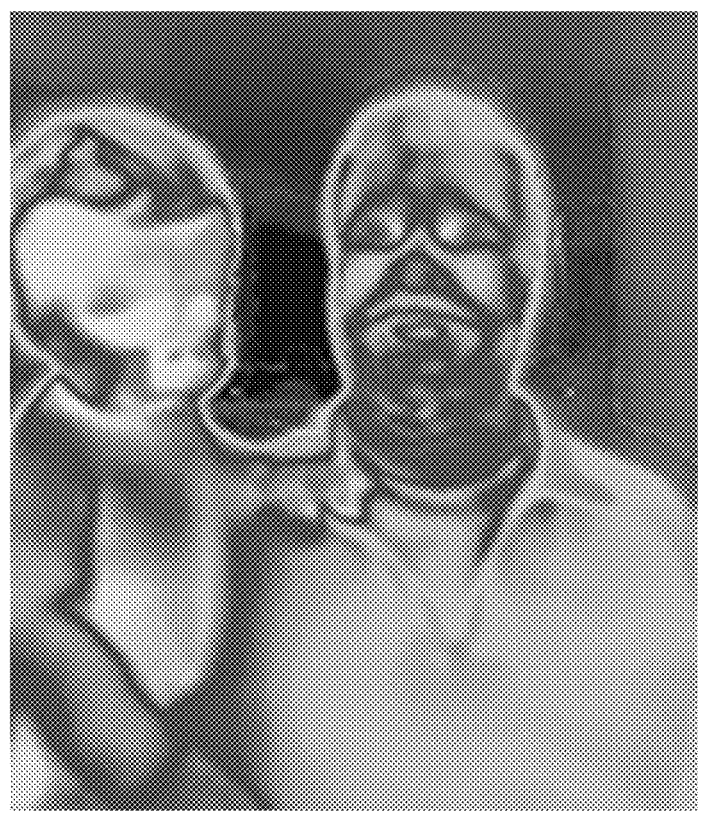
FIG. 12 is a diagram illustrating a sample of elevated (left) and normal temperature (right).

FIG. 12 is a diagram illustrating a sample of elevated (left) and normal temperature (right). Given an input thermal video or thermal frame (FIG. 12), the image is passed through an algorithm which first detects the presence and location of a person's exposed skin (e.g., head/face, arms, legs).

Figure 13:
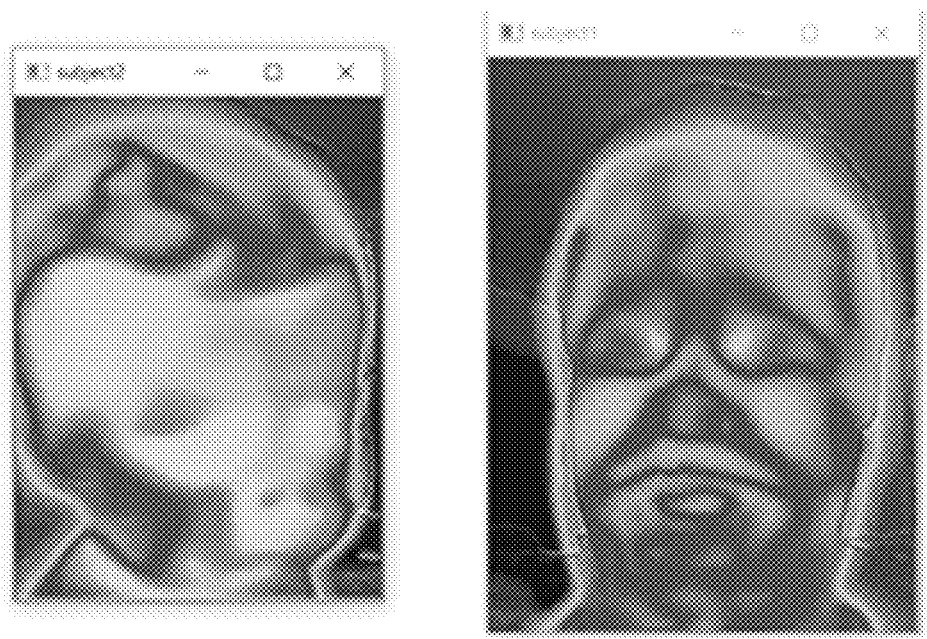
FIG. 13 is a diagram illustrating head regions.
Figure 14:
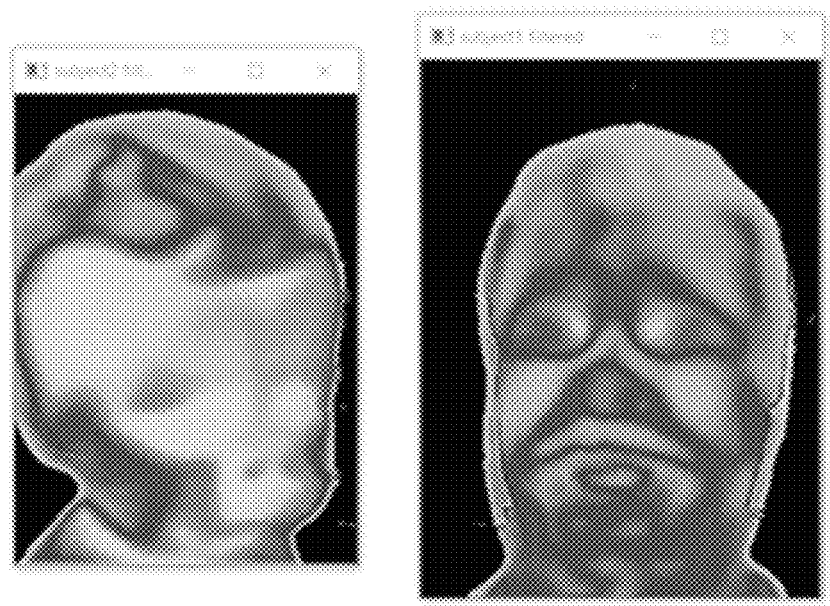
FIG. 14 is a diagram illustrating regions of interest for classifying as elevated (left) or normal temperature (right).

FIG. 13 is a diagram illustrating head/face regions. FIG. 14 is a diagram illustrating regions of interest for classifying as elevated (left) or normal temperature (right). The sub-image containing only these regions (FIG. 13) is passed through any number of preprocessing stages like, for example, pixel filtering to remove the irrelevant pixels (FIG. 14). Irrelevant pixels are defined as those outside of the exposed skin regions, or those that do not exhibit enough colour contrast to be correlated with elevated temperatures (e.g., contrasting brightness or intensity of pixels across the regions of interest).

Figure 15:
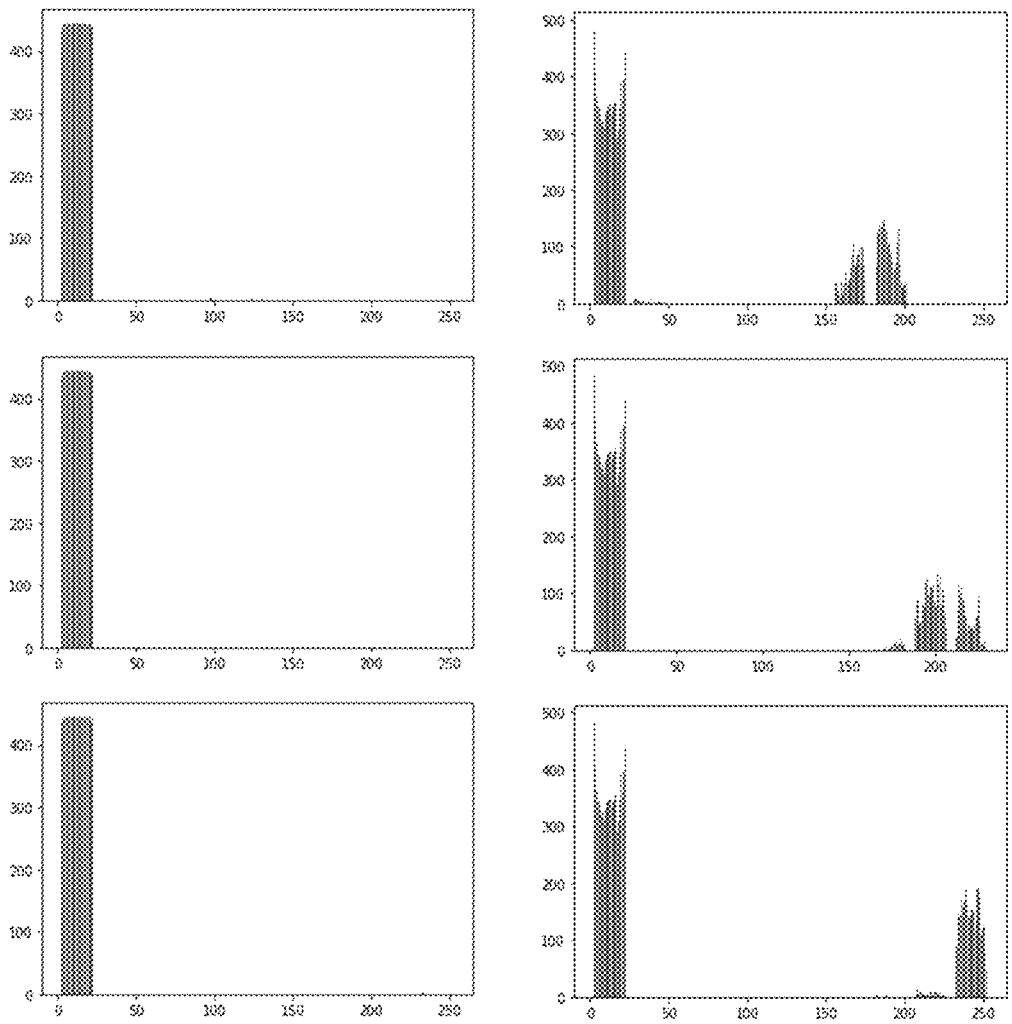
FIG. 15 is a diagram illustrating evaluating noise of resulting colour channels with elevated temperature shown on the left and normal temperature shown on the right.

FIG. 15 is a diagram illustrating evaluating noise of resulting colour channels with elevated temperature shown on the left and normal temperature shown on the right. The remaining sub-image is then analyzed further by breaking it into colour channels and programmatically evaluating the noise of the resulting histograms, as shown in FIG. 15. According to FIG. 15, one can see that there appears to be (at least according to the scale of the thermal temperatures in this image) a difference between the elevated subject (left) and the normal subject (right). This mathematical model can be automated and deployed as software to screen persons for elevated temperatures in real-time highlighting those that require secondary screening.

Figure 16A:
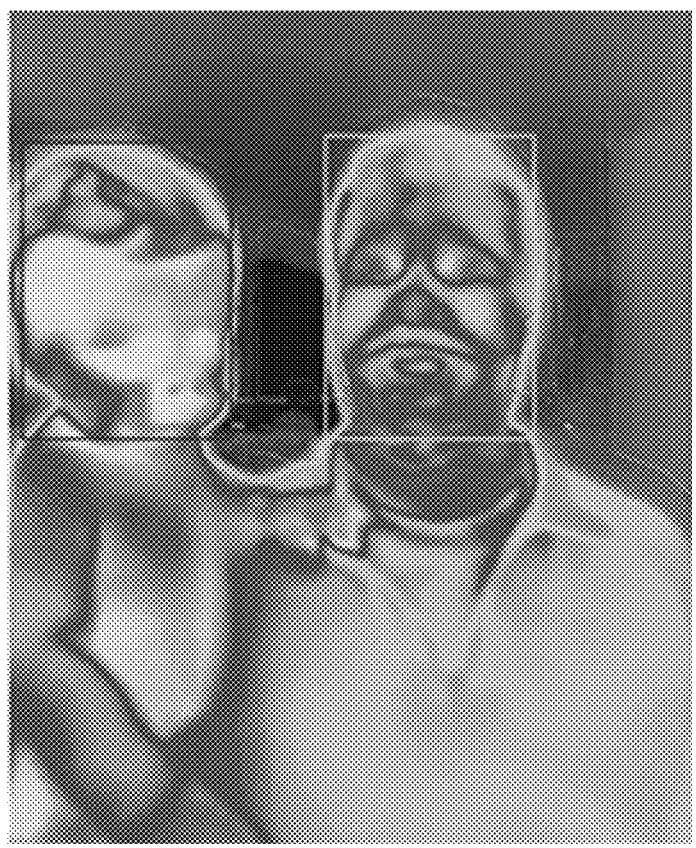
FIGS. 16A and 16B are diagrams illustrating outputs to the end user.
Figure 16B:
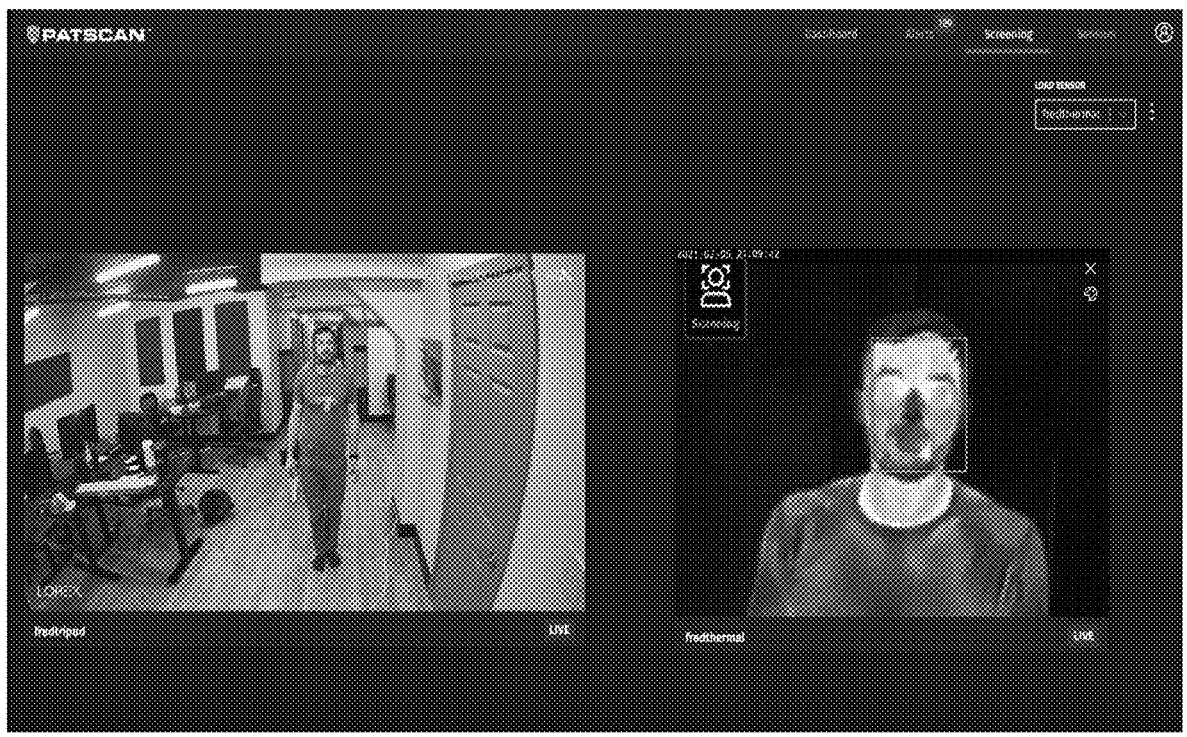

An example of possible output to the end user are shown in FIGS. 16A and 16B. According to FIG. 16B, a user interface displays the output of the mask compliance module (left) and thermal screening module (right). Both of these modules can be run simultaneously and the information can be fused into one output for easier interpretation by security personnel.

Figure 17:
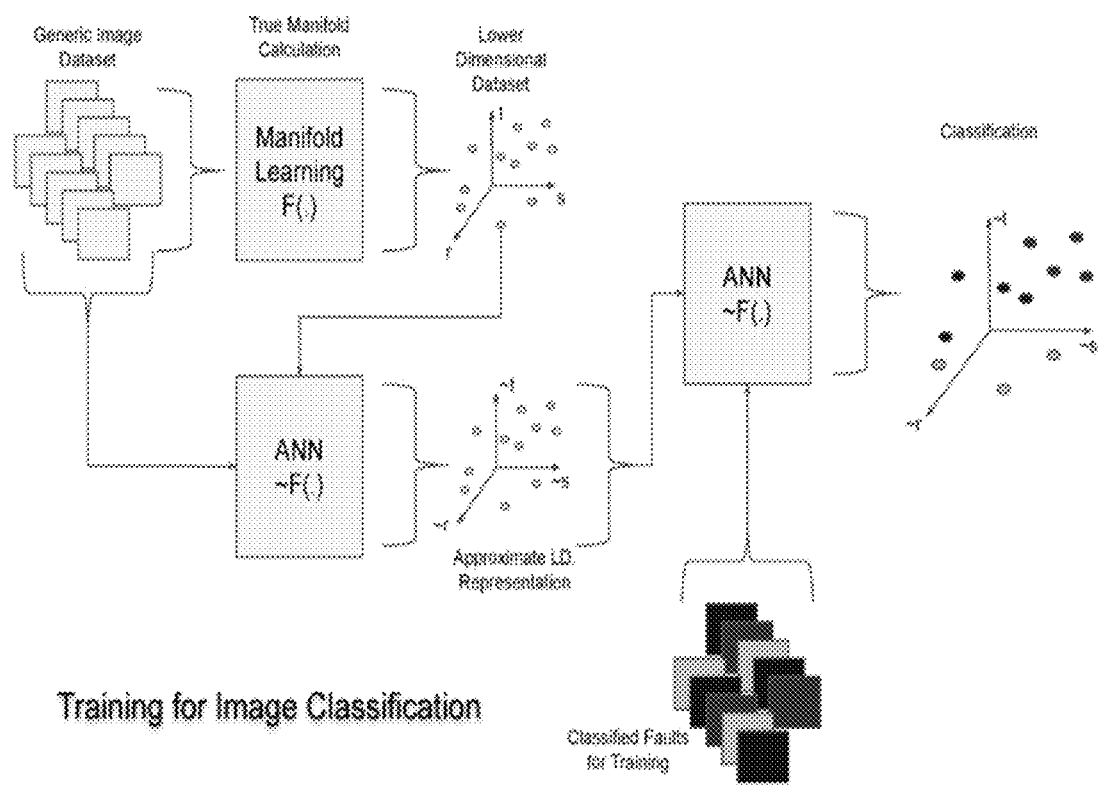
FIG. 17 is a diagram illustrating an example of training and using a Manifold learning model.
Figure 18:
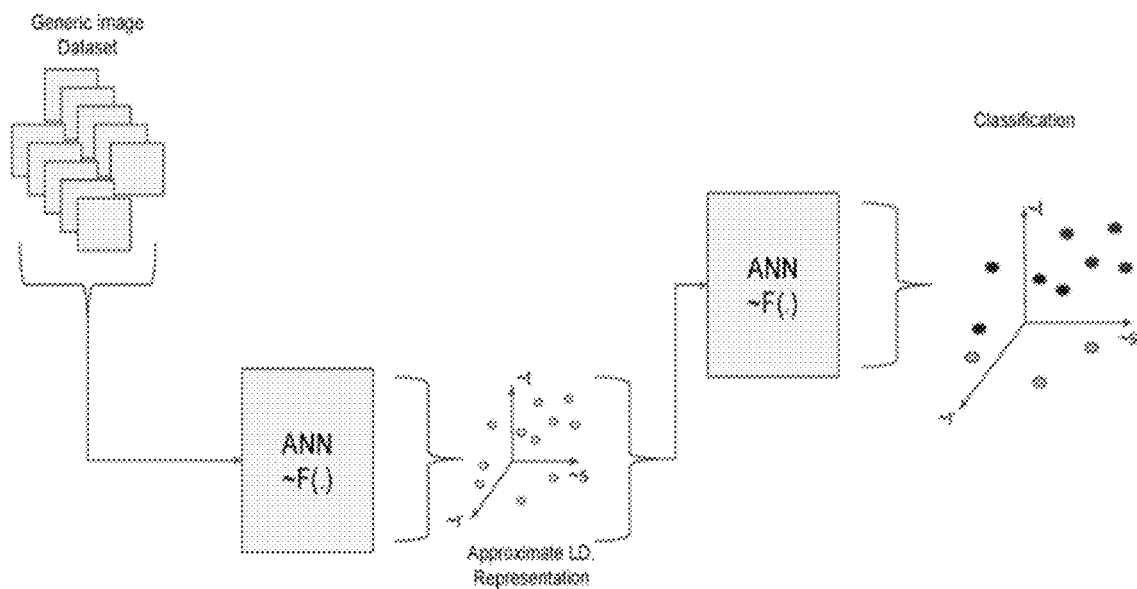
FIG. 18 is a diagram illustrating a classification example illustrating online "normal and "elevated body temperature".

Manifold Learning Model:

FIG. 17 is a diagram illustrating an example of training and using a Manifold learning model. FIG. 18 is a diagram illustrating a classification example illustrating online "normal and "elevated body temperature". As seen in FIG. 17 and FIG. 18, more sophisticated model can be achieved using Manifold Learning approaches where a large dataset consisting of images of persons exhibiting 'normal temperatures' and 'elevated temperatures' are mapped to a lower dimensional representation. This creates a 'learned' network that can be used to classify newly encountered examples for elevated temperatures based on local geometries and pixel intensities. Building a Manifold Learning model can be simplified due to its inherent clustering effect based on just a few feature descriptors. FIG. 17 shows the training process. FIG. 18 shows the online 'normal' and 'elevated body temperature' classification example.

As discussed above, Manifold Learning can often find low level features through geometric intuition in images that are imperceptible to humans. It is this characteristic of Manifold Learning models, that they are not dependent on manual feature selection, that makes them particularly suitable for evaluating and highlighting persons with elevated temperatures using only commodity-based lower precision thermal cameras.

In a further embodiment, disclosed herein is a multi-sensor threat detection system used for elevated temperature detection, the system comprising a processor, a sensor acquisition module, an optical and thermal camera configured to capture image data using the sensor acquisition module, a plurality of connected algorithms that correlates pixel value to thermal reading using a Manifold learning algorithm and a user interface configured to provide notification and alerts, The optical camera of the multi-sensor threat detection system further comprises a face mask detection camera. The thermal camera of the multi-sensor threat detection system further comprises a body temperature detection camera. The multi-sensor threat detection system further comprising a mobile alert module configured to send alerts to mobile devices.

The multi-sensor threat detection system further comprising administering pre-screening guidelines to acquire a face image. The pre-screening guidelines are selected from a list consisting of removing glasses, removing a mask, removing a hood, removing a hat, pulling back hair from the face, removing a scarf from the face.

The multi-sensor threat detection system further comprises the step of re-cropping a face image and sending a cropped image from the nose upwards to a Manifold classifier of the Manifold learning algorithm. The cropped image includes a subset of the face indicating key points around the eyes.

The Manifold learning algorithm further comprises reducing the dimensionality down to 10-12 feature descriptors from the image and providing the highest correlation to the ground truth number and unsupervised learning.

In a further embodiment, a computer-implemented method for elevated temperature detection using commodity-based thermal camera is disclosed. The method comprises receiving a series of input from frames from the thermal camera, using a deep learning algorithm to localize area of face from the frame images, cropping a face sub-frame from the image using the localized area of the face, sending the face sub-frame to a Manifold learning algorithm classifier to produce a classification for each image, conducting post-processing and determine whether there is evidence to support an anomalous reading to suggest a fever, if there is no fever detected, provide a pass notification indicating that the subject can enter the facility, if there is an anomalous reading or evidence to support the anomalous reading, provide a fail notification indicating that the subject is required to go to secondary screening or denied entry and recording the fail response and data onto a computer server for triaging.

The computer-implemented method for elevated temperature detection wherein the steps to determine fever further comprising detecting evidence of a higher temperature, analyzing a plurality of framed images during a temporal window based on pre-conditions and if a certain threshold of framed images are being classified as a higher temperature, provide an output of fail notification.

According to the aforementioned computer-implemented method, a fail notification further comprises detection of higher temperature or anomalous temperature reading. The threshold further comprises 3 or more framed images being classified as higher temperature.

In a further embodiment, a computer-implemented method for face mask detection using an optical camera is disclosed, wherein the method comprising receiving a series of input from frames from the optical camera, using an object detection localization algorithm to localize area of face from the frame images, creating a mask compliance model, sending the face frame to a mask compliance analytic for processing, conducting post-processing and determine whether a person is unmasked, if a person is present and the face is unmasked, provide a non-compliant condition, generate an alert/notification using the user interface.

According to the above method, the object detection localization algorithm is selected from a list consisting of RetinaNet, Mask RCNN and YOLO. Furthermore, the step of creating a mask compliance model further comprises the step of training a plurality of different labelled images on masking conditions. The masking conditions is selected from a list consisting of people wearing masks, and people not wearing masks, in a variety of environments, camera angels and crowd densities.

According to the above method, the step of mask compliance analytic processing further comprising identifying in the image whether a person is in the image, and if so, determines the localization of their face is masked or unmasked if enough of their face is present in the frame.

Implementations disclosed herein provide systems, methods and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A multi-sensor threat detection system for elevated temperature detection, the system comprising:
   a processor;
   a sensor acquisition module;
   an optical and thermal camera configured to capture image data using the sensor acquisition module;
   a plurality of connected algorithms that correlate pixel value to thermal reading using a Manifold learning algorithm; and
   a user interface configured to provide notification and alerts;
   wherein the multi-sensor threat detection system is configured to administer pre-screening guidelines to acquire a face image;
   wherein the pre-screening guidelines are selected from a list consisting of removing glasses, removing a mask, removing a hood, removing a hat, pulling back hair from the face, removing a scarf from the face.

2. The system of claim 1 wherein the optical camera further comprises a face mask detection camera.

3. The system of claim 1 wherein the thermal camera further comprises a temperature detection camera.

4. The system of claim 1 further comprising a mobile alert module configured to send alerts to mobile devices.

5. The system of claim 1 further comprising the step of re-cropping a face image and sending a cropped image from the nose upwards to a Manifold classifier of the Manifold learning algorithm.

6. The system of claim 5 wherein the cropped image includes a subset of the face indicating key points around the eyes.

7. The system of claim 1 wherein the Manifold learning algorithm further comprises reducing the dimensionality to 10-12 feature descriptors from the image and providing the highest correlation to the ground truth number and unsupervised learning.

8. A computer-implemented method for elevated temperature detection using a commodity-based thermal camera, the method comprising:
   receiving a series of inputs from frames from the thermal camera;
   using a deep learning algorithm to localize an area of a face from the frame images;
   cropping a face sub-frame from the image using the localized area of the face;
   sending the face sub-frame to a Manifold learning algorithm classifier to produce a classification for each image;
   conducting post-processing to determine when there is evidence to support an anomalous reading suggesting a fever;
   when there is no fever detected, provide a pass notification indicating that the subject can enter the facility;
   when there is an anomalous reading or evidence to support the anomalous reading, provide a fail notification indicating that the subject is required to go to secondary screening or denied entry;
   recording the fail response and associated data onto a computer server; and
   administering pre-screening guidelines to acquire a face image;
   wherein the pre-screening guidelines are selected from a list consisting of removing glasses, removing a mask, removing a hood, removing a hat, pulling back hair from the face, removing a scarf from the face.

9. The method of claim 8 wherein the steps to determine fever further comprise:
   analyzing a plurality of framed images during a temporal window based on pre-conditions; and
   when a certain threshold of framed images are classified as a higher temperature, providing an output of fail notification.

10. The method of claim 9 wherein a fail notification further comprises detection of higher temperature or anomalous temperature reading.

11. The method of claim 8 wherein the threshold further comprises 3 or more framed images being classified as higher temperature.

* * * * *